United States Patent [19]

Merli et al.

[11] 4,279,286
[45] Jul. 21, 1981

[54] PNEUMATIC TIRES HAVING ORNAMENTED SIDEWALLS, AND TO THEIR MANUFACTURE

[75] Inventors: Claudio Merli, Cormano; Carlo Francia, Monza, both of Italy

[73] Assignee: Euteco S.p.A., Milan, Italy

[21] Appl. No.: 118,698

[22] Filed: Feb. 5, 1980

Related U.S. Application Data

[62] Division of Ser. No. 843,307, Oct. 18, 1977, Pat. No. 4,224,268.

[30] Foreign Application Priority Data

Nov. 19, 1976 [IT] Italy .............................. 29539 A/76

[51] Int. Cl.³ ............................................. B60C 13/00
[52] U.S. Cl. ........................ 152/353 R; 152/DIG. 12; 156/116
[58] Field of Search .................. 152/DIG. 12, 353 R, 152/354 R, 355, 357; 264/74, 78, 245, 246, 326, 271, 275, 139, 161, 162, 224, 318, 359; 156/116, 303.1, 242, 245

[56] References Cited

U.S. PATENT DOCUMENTS

| | | | |
|---|---|---|---|
| 1,544,262 | 6/1925 | Midgley | 156/DIG. 12 |
| 1,904,289 | 4/1933 | Neidich et al. | 264/245 |
| 1,989,703 | 2/1935 | Leguillon | 264/245 |
| 2,761,489 | 9/1956 | Kraft | 264/245 |
| 3,164,192 | 1/1965 | Kasio et al. | 156/116 |
| 3,439,083 | 4/1969 | Ugolini | 264/245 |
| 3,769,123 | 10/1973 | Botts et al. | 264/326 |
| 3,843,438 | 10/1974 | Gabriel | 156/303.1 |
| 4,170,503 | 10/1979 | Buchanan et al. | 156/116 |

*Primary Examiner*—John E. Kittle
*Attorney, Agent, or Firm*—Sughrue, Mion, Zinn, Macpeak & Seas

[57] ABSTRACT

A pneumatic tire casing have at least one sidewall ornamental with patterns being made of an elastomer of a color different from that of the sidewall which covers the carcase of the tire, by compelling during moulding and vulcanization of the tire a thin layer of elastomer of a color different from that of the sidewall into the width of the latter, so as to obtain that said layer becomes arranged at the bottom of a recess formed in a part of the outer surface of the tire casing.

2 Claims, 15 Drawing Figures

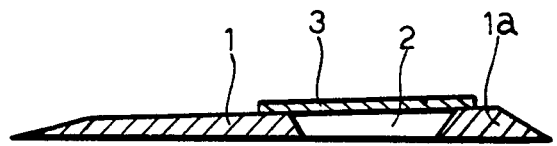
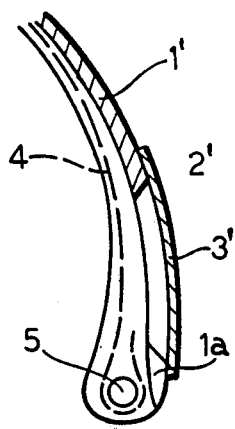 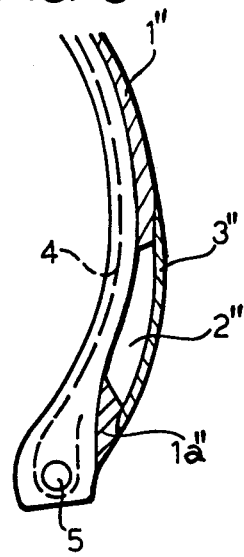 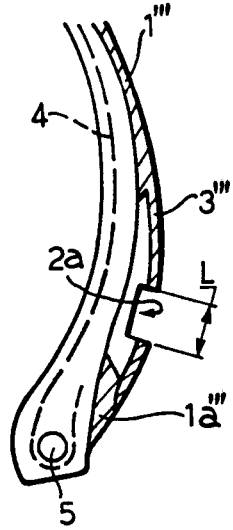
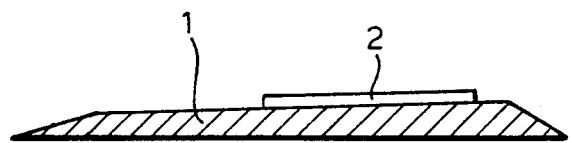

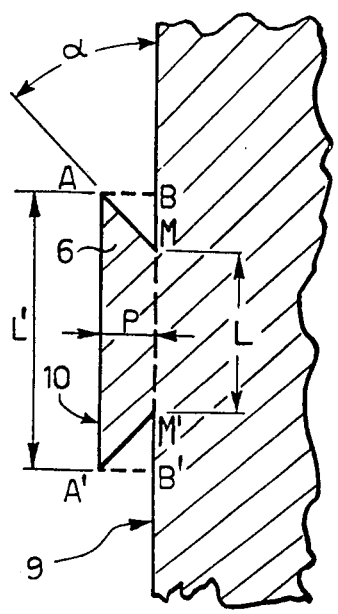
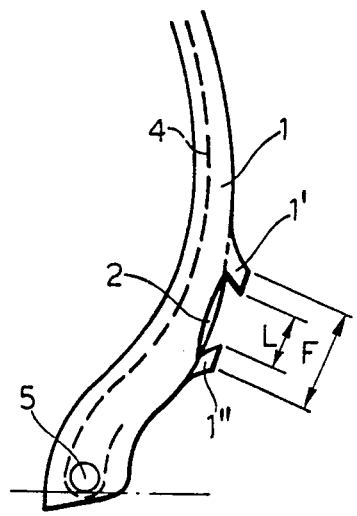
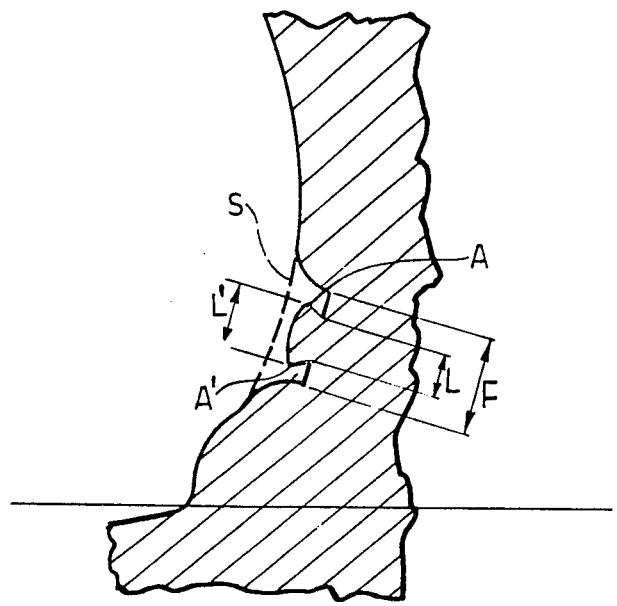

PNEUMATIC TIRES HAVING ORNAMENTED SIDEWALLS, AND TO THEIR MANUFACTURE

This is a Division of application Ser. No. 843,307, filed Oct. 18, 1977, now U.S. Pat. No. 4,224,268.

BACKGROUND OF THE INVENTION

The present invention relates to improvements to pneumatic tires of the type in which the casing has at least one sidewall ornamented with patterns in the form of a circular ring or several circular rings, or in the form of inscriptions, markings or ornaments of different kind, the said patterns being of an elastomer of a colour different from that of the sidewall which covers the carcass, so as to appear with particularly eye-catching characteristics on the black background.

The invention also relates to improvements to the manufacture of the pneumatic tires of the kind set out above.

The elastomer of a colour different from black, normally used in the art to provide patterns on the sidewalls of tires, undergoes more rapid deteriorations in time than the other parts of the tire, mainly because it is not reinforced with the lampblack filler.

In fact the said elastomer can be easily lacerated, ages rapidly and cranks to the extent that in time it fissures, developing incisions of considerable size, such as will significantly impair and compromise the efficiency of the carcass.

The said cracks and slits develop more readily and more prematurely when the carcass is of the radial type, due to the fact that such a carcass is more deformable and, therefore, the thickness of non-black elastomer is subject to greater stresses in working conditions, which do not occur in carcasses of the cross-ply type.

Hardly noticeable improvements are achieved by applying to the radial carcasses non-black elastomeric mixtures of high quality and therefore very expensive.

In the following description a non-black elastomer will be called "white" for the sake of brevity, this will be intended to signify any colour different from black.

White is in any case the most widely used colour for applying patterns to the sidewalls of tires.

OBJECTS OF THE INVENTION

Therefore, one of the objects of the present invention is a tire casing provided on at least one of its sidewalls with a pattern in white elastomer, free or substantially free of the aforementioned disadvantages.

A further object of the present invention is an improvement to the method for producing the said pneumatic tire casing.

Yet a further object of the present invention is a mould suitable for producing the said tire casings.

THE INVENTION

According to the present invention there is provided a pneumatic tire casing of the type comprising two sidewalls formed essentially of black elastomer which cover the carcase externally, at least one of these sidewalls being ornamented with patterns in the form of at least one circumferential ring or inscriptions, markings, decorations or other of an elastomer or a colour different from that of the sidewall, forming an integral part with the black elastomer of the sidewall, characterized by the fact that each of said patterns made of an elastomer of colour different from that of the sidewall has the form of a layer arranged at the bottom of a recess provided in the outer face of the sidewall of the tire casing, this recess having a trapezium or "dovetail" cross-section, with its major base formed by the bottom of the said recess on which lies the layer of "white" elastomer, and with the minor base turned towards the outside of the tire casings outer face.

The present invention is applicable to casings the carcase of which is formed of one or more plies having threads (cords) alternatively crossed when passing from one ply to the immediately adjacent one, (cross-ply carcasses), it is also applicable to casings with a carcass formed of one or more plies the cords of which lie in planes which pass through the axis of rotation of the tire or form small angles with the said planes (radial carcasses) and finally it is applicable to casings with a carcass in which the cords of the individual plies follow in their development a path partly typical of a cross-ply carcase and partly typical of a radial ply carcase.

As will be made evident by the following description, by means of the present invention various objects are achieved, both technical and economic.

In particular, it is now possible to produce by direct moulding, decorations in an already finished form, without the surfaces forming the ornamental pattern requiring further work or retouching.

Furthermore, it has been made easy to produce not only circular rings of simple and well defined geometry, but also inscriptions and decorations of any irregular pattern whatever, in any area of the casing.

Such pattern of irregular design are actually made by hand in the prior art, by means of brush and special paints, or by other complicated methods. By operating according to the present invention only small quantities by weight of the white elastomer are required and only small thicknesses of the latter.

This, on the one hand, protects the surface of the white elastomer from cracks caused by concentrated stresses, inasmuch as the thin layer of elastomer follows the deformations of the underlying black layer which has the same hardness and modulus of elasticity as the rest of the casing, and on the other hand, makes it possible to effect an economy both because of the small amount of elastomer used and because of the substantial absence of finishing operations, as will be made evident hereinafter.

It is known that generally the white circular rings are provided, for aesthetic and ornamental reasons, on the sidewalls of the casings and usually in that part of the sidewall found between the position of maximum width of the inflated casing and the edge of the mounting rim, that is to say in an area called the cushion, where the thickness of the sidewall is most consistent.

More particularly, according to the prior art one proceeds in the following manner.

One prepares the raw casing (that is, not yet vulcanized) one sidewall of which is formed partly of black elastomer and partly of white elastomer interposed between the parts of black elastomer thus impairing the strength of the casing.

One then covers the area of white elastomer with a thin layer of black elastomer and one introduces the casing into a mould of which the wall turned towards the area containing the white elastomer is generally smooth.

One then proceeds with the vulcanization which results in the production of an externally black casing.

For the purpose of providing one or more areas with a white circular ring, the casing is mounted onto a circular rim and inflated and one then proceeds with the grinding of the surface of the sidewall, by means of a grinding wheel of predetermined width, by rotating the casing centered on the axis of rotation. In this manner the thin layer of black elastomer is removed.

All this involves complicated and burdensome operations, the surface of white elastomer which becomes exposed is impaired by the grinding wheel and, moreover, phenomena of overheating occur and consequently a decrease in the characteristic qualities of the elastomer.

In particular, the surface of the white elastomer has a scratched appearance after the grinding operation, this contributing to making it more readily prone to attack by atmospheric agents, more readily soiled and more prone to fissures, especially starting from the incisions produced by the grinding wheel. The "white" surface thus provided is not as glossy and smooth as the remaining part of the moulded casing.

According to a further aspect of the present invention all these disadvantages are avoided by providing a method for the manufacture of a tire casing of the type set out above, comprising:

the applying and fixing in a suitable position on the black elastomer of the raw tire casing of a thin layer of "white" elastomer of a width greater than that of the decoration required;

compelling at least the part of said layer lying inside its margins into the thickness of the elastomer forming the body of the sidewall of the raw tire casing, by closing said casing in a mould the inner surface of which is provided with projections dove-tail shaped in cross-section and having the form of the decoration required;

vulcanizing the raw tire casing and finishing it after extraction from the mould by removing the residual "white" elastomer eventually present on the sides of the recess moulded in the outer face of the sidewall of the casing, bearing on its bottom having a width greater than the respective inlet the layer of elastomer of a colour different than that of the sidewall of the said casing.

After moulding the casing one obtains the decoration in a finished form and of the required colour and this without further retouching to the bottom of the recess.

It is only necessary to effect a brushing, for example with a rotating metal brush, to remove the residues of white elastomer present externally of the groove.

The invention will now be described with reference to the appended drawings wherein:

FIG. 1 is a cross-section of an element used in the manufacture of a pneumatic tire having a casing ornamented with at least one white ring, in accordance with the known techniques;

FIGS. 2 to 4 are cross sections of a part of a pneumatic tire casing, showing three successive steps of manufacture of a tire having a casing ornamented with a white ring, by use of the element according to FIG. 1;

FIG. 5 is a cross-section of an element used in the manufacture of a pneumatic tire having a casing ornamented with at least one white ring, in accordance with the present invention;

FIG. 10 is an enlarged cross-section of a detail of the mould shown in FIG. 7;

FIG. 11 is a cross-section of a part of a pneumatic tire casing;

FIG. 12 is a cross-section of a part of a mould adapted to be used for manufacturing the tire casing shown in FIG. 11;

In all Figures similar elements are indicated by identical reference numerals.

Figure 6:
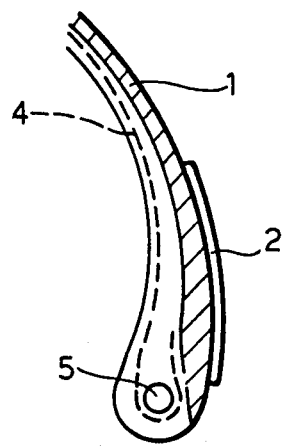
FIG. 6 is a cross-section of a part of a pneumatic tire casing, showing a step, similar to that illustrated in FIG. 2, of manufacture of a tire casing ornamented with a white ring, by use of the element shown in FIG. 5.

In particular, in FIG. 1—showing in section the element forming a raw semifinished sidewall ready to be applied to a casing which should be provided with one or more circular "white" rings in accordance with the known techniques—the black elastomer of the sidewall is indicated by 1 and 1a and the "white" elastomer by the reference numeral 2.

A thin layer 3 of black elastomer covers the strip 2 of "white" elastomer.

One is therefore dealing with four distinct parts which should be assembled to one another.

The strip 1a of black elastomer obtained by drawing or extruding, intended to be positioned in the area of the bead of the casing, is normally used to confer to the bead portion of the cover characteristics of resistance to abrasion greater than those obtainable with the "white" elastomer and this in view of the movements to which the sand bead portion of the cover is subjected to against the edge of the mounting rim on which it rests. The element of FIG. 1 is thus applied to a raw casing (not vulcanised) in order to form the sidewall and the bead of the casing. FIG. 2 shows the resulting structure before its introduction into a vulcanizing mould.

Moreover, in the said FIG. 2, 4 indicates the ply of the carcase anchored to the bead wire 5.

After moulding the outer surface of the sidewall of the casing becomes smooth as shown in FIG. 3, and is then ground by means of a grinding wheel of width L in order to uncover on the sidewall of the black casing a circular band 2a of width L (FIG. 4), of white colour on the sidewall the remaining parts of which are black.

The half finished sidewall according to the present invention, shown in FIG. 5 comprises a portion 1 made of black elastomer and a thin layer 2 of white elastomer applied to the surface of the portion 1 intended for forming the outer face of the sidewall of the casing. The thickness of the layer 2 is 0.3 mm in the case under discussion and more generally it can assume values of 0.1 to 2.5 mm.

FIG. 5 shows the great simplicity of the half finished sidewall according to the invention inasmuch as it is formed of only two parts, and this in comparison with FIG. 1.

FIG. 6 shows a situation corresponding to that of FIG. 2, the raw casing being in this case prepared by applying the half finished sidewall of FIG. 5, prepared according to the present invention, to the carcass of the tire being built. The raw tire so prepared is placed in a vulcanization mould (FIG. 7) the inner sidewall of which is formed with a projection 6 having a circular ring configuration coaxial with the mould axis, capable of providing on the tire sidewall a pattern identical to that of FIG. 4 which is obtained by grinding.

Figure 7:
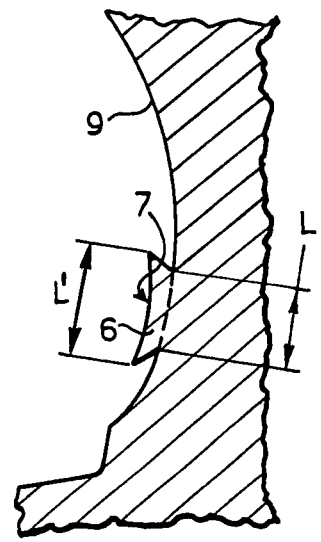
FIG. 7 is a cross-section of a part of a mould intended for vulcanizing of the tire casing shown in FIG. 6.

The projection 6 of the inner sidewall of the part of the mould shown in FIG. 7 has a dovetail section.

The width L of its base (which is integral with the mould is equivalent to the width of the grinding wheel used to obtain the "white" circular ring of FIG. 4) is smaller than the width L' of the surface 7 of the said projection 6 facing the inner of the mould. Since the raw casing shown in FIG. 6 is made so that upon its placing and vulcanization within the mould, one part of which is shown in FIG. 7, the "white" layer 2 will be acted upon by the projection 6, in the sidewall of the tire casing an annular groove 8 is formed which reproduces in negative (FIG. 8) the form of the dovetail projection 6 of the mould of FIG. 7.

The bottom of the said groove 8 of width L' is "white" because of the presence of the layer 2 of "white" elastomer, whilst the annular zone H and H' practically delimits, for an outside onlooker, a band in the form of a circular ring of a width approximately equal to L.

Figure 9:
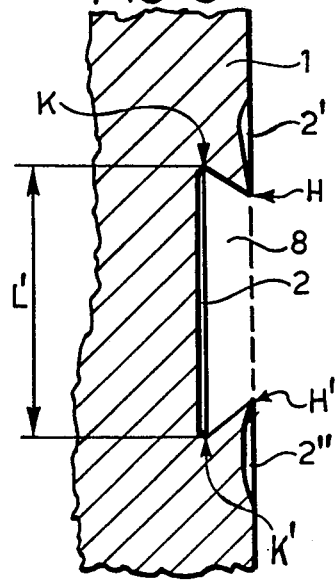
FIG. 9 is an enlarged cross-section of a detail of the tire casing shown in FIG. 8.

As is clearer shown on larger scale in FIG. 9, the surface 7 of width L' of the projection 6 of the mould, shears and carries with it upon closing of the mould a portion of equal width L' of the layer 2 of "white" elastomer which proceeds to locate itself in the bottom of the recess 8 formed in the sidewall of the casing.

This portion of the layer 2 of "white" elastomer has in section an almost lenticular shape, that is to say, slightly thinned down in the corners K and K' of the annular recess 8.

Figure 8:
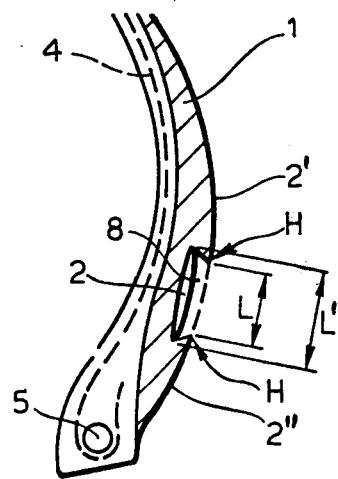
FIG. 8 is a cross-section of a part of a tire casing obtained by vulcanization of the tire shown in FIG. 6 in the mould according to FIG. 7.

On the other hand the reflux of black elastomer of the sidewall is such that the zones H and H' are completely black and well defined and only at a distance of a few millimeters, in positions external to the said zones H and H', small annular portions of the "white" elastomer reappear, these being indicated by 2' and 2" in FIGS. 8 and 9.

These portions are removed and eliminated by brushing, for example, by means of a rotary metal brush, the treatment being in every case in positions external to the groove 8 the bottom of which is not touched.

The said portions 2' and 2" of "white" elastomer being, of minimal thickness and not very resistant to abrasion (because the elastomer in question is not filled with lampblack), their removal is easy and quick.

Possible slight moulding imperfections of the "white" elastomer in the corners K and K', are hidden from sight by the zones H and H' of the black elastomer, so that the result is always excellent and there are no risks of rejects.

Structural details of the mould provided with an annular projection having a dovetail cross-section and the method of manufacture of said mould will be now explained with reference to FIG. 10.

In particular, on the mould inner wall 9 (drawn flat for the sake of simplicity) a projection is provided, during the turning of the actual mould, formed by an annular ridge 6, having a rectangular cross-section ABB'A'.

By means of milling one removes the parts which appear triangular in cross-section and which are indicated by the areas ABM and respectively A'B'M' in FIG. 10, so that the distance L' is greater than that of L by the amount required.

Obviously, the segments AM and A'M' in FIG. 10 can be curved (concave or convex) instead of linear. Furthermore, the external surface 10 of the projection 6 instead of being flat can be curved (concave or convex) or knurled, or other.

In the most simple case the segments AM and A'M' form an angle $\alpha$ with the wall 9 of the mould (or better with the planes tangential to the said wall at the points H and H') having a value of 10° to 80° and preferably of 30° to 60°.

Moreover, the height P of the ridge 6 with respect to the wall 9 of the mould conveniently assumes values of 1 to 15 mm and preferably of 2 to 4 mm.

In a modified embodiment of an ornamented tire casing according to the present invention (FIG. 11), the decoration is recessed with respect to the external surface of a ridge of black colour, the said ridge itself projecting out from the sidewall 1 of the casing.

In this FIG. 11, 1' and 1" indicate the parts of the said ridge which are black, in relief with respect to the sidewall 1, which together form a circular ring of width F projecting from the sidewall itself. In the ambit of this ridge the groove 8 is moulded which carries at its bottom the thin layer 2 of "white" elastomer, the visible part of which is substantially a circular ring of width L.

In the case in question the level of the white bottom of the recess coincides with the notional projection of the surface of the black sidewall 1. This level can in any case be more recessed or more external with respect to this projection of the tire casing sidewalls 1.

In the mould capable of impressing on the casing a white circular ring within the black ridge of width F as described with reference to the FIG. 11, the width L of the base of the projection 6' having a dove tail shape is equal to the desired width of the visible part of the "white" ring. L' corresponds in turn to the width of the bottom of the recess covered by the layer of "white" elastomer.

Obviously the mould can be so shaped that the surface AA' of the bottom of the mould's recess is placed externally to the notional line of connection S of the surface 9 of the mould, instead of at the same level as indicated in FIG. 12.

It is obviously possible, by means of a technique similar to that above described, to prepare moulds with projections of any shape or configuration for the moulding of any type of decoration or inscription different from circular rings.

Thus one can effect according to the invention the impression of any letter of the alphabet on the side of the casing, for example of the letter T.

Figure 13:
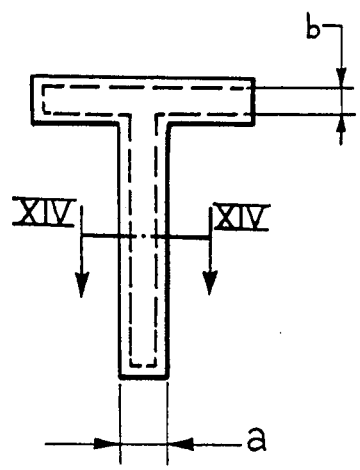
FIG. 13 is a plan view of a part of the inner face of a mould modified in order to be adapted for manufacturing tire coverings having formed on their outer walls the letter "T", in accordance with the present invention.

In such case the mould would carry a projection capable of producing the moulding of the letter T, shown in plan view in FIG. 13.

In the latter the continuous line indicates the outline of the farthest projecting surface of the inner face of the mould and the dashed line indicates the outline of the base of this projection which lies at the level of the surface of the inner face of the mould.

Figure 14:
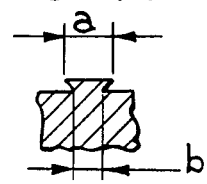
FIG. 14 is a section on line XIV—XIV of FIG. 13.
Figure 15:
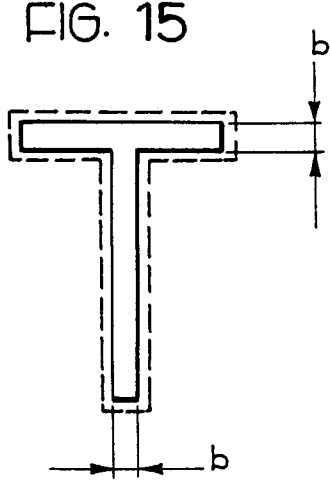
FIG. 15 is a plane view of a part of the outer face of a tire casing manufactured using the mould shown in FIGS. 13 and 14.

In FIG. 15 showing in plan view, as would appear to an observer, the letter T moulded on the surface of the tire casing, the continuous line indicates the visible perimeter of the letter which has a width b, equal, that is, to the width of the base of the projection in the mould shown in FIG. 14. The dashed line in FIG. 15 is that which delimits the surface of the bottom of the recess covered by the "white" elastomer.

We claim:

1. A pneumatic tire casing of the type having a pair of side walls formed of black elastomer comprising at least one recess formed in one of said side walls having a bottom surface and upwardly and inwardly tapering side surfaces to define a dovetail shaped cross section and a layer of elastomer having a color different from that of said side walls and a thickness less than the depth of said recess secured to and covering only said bottom surface of said recess.

2. A pneumatic tire as set forth in claim 1 wherein said layer of elastomer has a thickness from 0.1 to 2.5 mm.

* * * * *